(12) United States Patent
Benson et al.

(10) Patent No.: US 12,384,878 B2
(45) Date of Patent: Aug. 12, 2025

(54) DOWNHOLE TOOL MEMBER COMPRISING A BRANCHED POLY(HYDROXYACID)

(71) Applicant: SOLVAY SPECIALTY POLYMERS USA, LLC, Alpharetta, GA (US)

(72) Inventors: Bryan Benson, Ball Ground, GA (US); Franck Touraud, Eyzin Pinet (FR); Yves Vanderveken, Leuven (BE)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 601 days.

(21) Appl. No.: 17/786,635

(22) PCT Filed: Dec. 11, 2020

(86) PCT No.: PCT/EP2020/085822
§ 371 (c)(1),
(2) Date: Jun. 17, 2022

(87) PCT Pub. No.: WO2021/122391
PCT Pub. Date: Jun. 24, 2021

(65) Prior Publication Data
US 2023/0013671 A1    Jan. 19, 2023

Related U.S. Application Data

(60) Provisional application No. 62/950,285, filed on Dec. 19, 2019.

(30) Foreign Application Priority Data

Dec. 18, 2019 (EP) ..................................... 19315161

(51) Int. Cl.
C08G 63/60    (2006.01)
E21B 41/00    (2006.01)
E21B 43/26    (2006.01)

(52) U.S. Cl.
CPC .............. *C08G 63/60* (2013.01); *E21B 41/00* (2013.01); *E21B 43/26* (2013.01); *E21B 2200/08* (2020.05)

(58) Field of Classification Search
None
See application file for complete search history.

(56) References Cited

U.S. PATENT DOCUMENTS

| | | | |
|---|---|---|---|
| 9,267,351 B2 | 2/2016 | Okura et al. | |
| 9,574,418 B2 | 2/2017 | Okura et al. | |
| 2011/0196125 A1 | 8/2011 | Wann | |
| 2013/0081801 A1 | 4/2013 | Liang et al. | |
| 2014/0011976 A1* | 1/2014 | Kim | C08G 63/66 528/302 |
| 2015/0292292 A1 | 10/2015 | Okura et al. | |

FOREIGN PATENT DOCUMENTS

| | | |
|---|---|---|
| WO | 2010112602 A1 | 10/2010 |
| WO | 2016173640 A1 | 11/2016 |
| WO | 2018115008 A1 | 6/2018 |

OTHER PUBLICATIONS

International Search Report issued in International Application No. PCT/EP2020/085822, mailed Mar. 11, 2021 (4 pages).
Written Opinion issued in International Application No. PCT/EP2020/085822, mailed Mar. 11, 2021 (6 pages).

* cited by examiner

*Primary Examiner* — Ramsey Zacharia
(74) *Attorney, Agent, or Firm* — Osha Bergman Watanabe & Burton LLP

(57) ABSTRACT

The invention relates to downhole tools comprising members comprising branched poly(hydroxyacid) polymers provided with improved degradation rate when in contact with water.

13 Claims, 1 Drawing Sheet

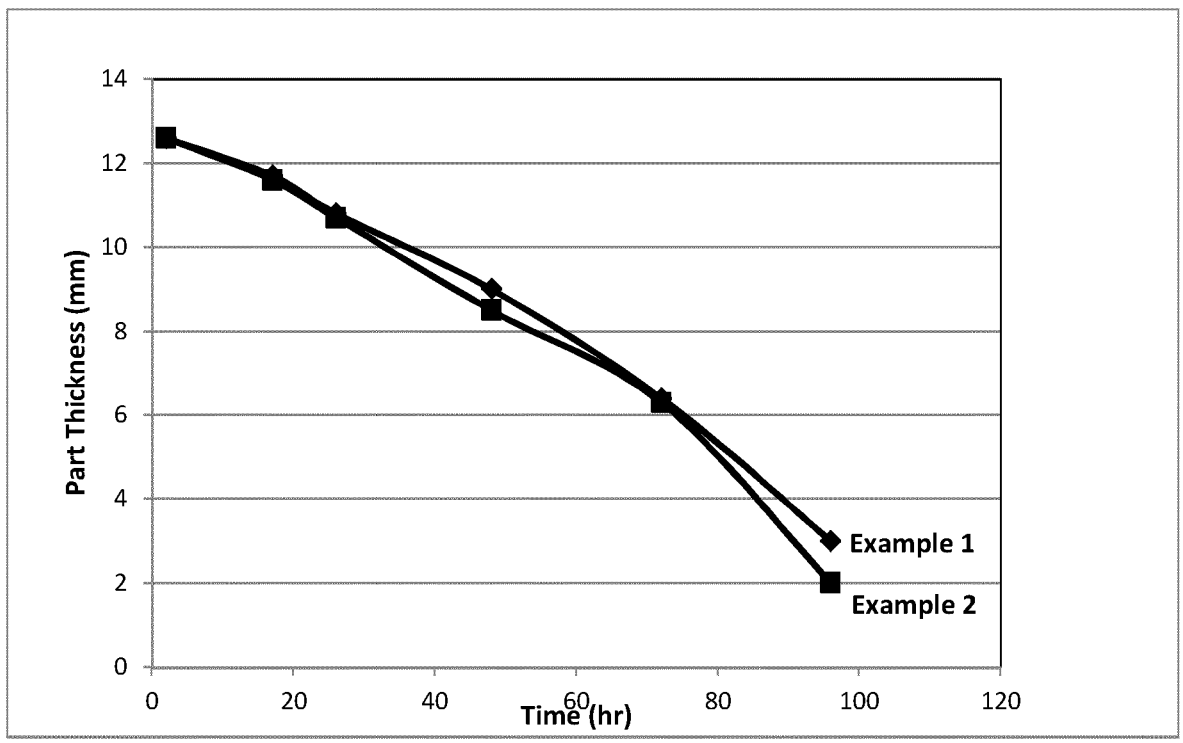

DOWNHOLE TOOL MEMBER COMPRISING A BRANCHED POLY(HYDROXYACID)

RELATED APPLICATIONS

The present application is a national stage of PCT Application No. PCT/EP2020/085822 filed on Dec. 11, 2020, which claims priorities filed on 18 Dec. 2019 in Europe with Nr 19315161.0 and filed on 19 Dec. 2019 in United States with No. 62/950,285, the whole content of each of these applications being incorporated herein by reference for all purposes.

TECHNICAL FIELD

The present invention relates to an article which forms a tool per se or a component thereof for formation or repair of downholes for extraction of hydrocarbon resources including oil and gas.

BACKGROUND ART

Hydrocarbon resources such as petroleum or natural gas are known to be produced by excavation through wells (oil wells or gas wells, collectively called "wells") having a porous and permeable subterranean formation. In wells that are continuously excavated, the productive layer is stimulated in order to continuously excavate hydrocarbon resources efficiently from subterranean formations. One method for increasing the extraction of hydrocarbons relies on the generation of fractures (also called "fracturing" or "hydraulic fracturing") in the productive layer using fluid pressure.

Hydraulic fracturing is a method in which fractures are generated in the productive layer by fluid pressure such as water pressure (called "hydraulic pressure" hereinafter). Generally, a vertical hole is drilled, and then the vertical hole is curved and a horizontal hole is drilled in a subterranean formation several thousand meters underground. Fracturing fluid is then fed into these boreholes (meaning holes provided for forming a well, also called "downholes") at high pressure, and fractures are produced by the hydraulic pressure in the deep subterranean productive layer. The productive layer is thereby stimulated and the hydrocarbon resource is extracted through the fractures.

In order to perform the above-mentioned well treatments, normally the method below is employed. Specifically, a prescribed section of a borehole or downhole is partially plugged and fractures are produced or perforation is performed in the productive layer by feeding a fluid such as fracturing fluid at high pressure into the plugged section or using a tool containing an explosive compound such as a perforation gun. Then, the next prescribed section (typically ahead of the preceding section, i.e., a segment closer to the ground surface) is plugged, and fracturing and the like are performed, causing the fractures and perforations to advance. After that, this process is repeated until the required isolation, fracturing, and the like have been completed.

By "downhole tool", it is meant according to the present invention, a tool used to form a downhole (may be referred to as a "borehole", a "wellbore" or a "subterranean drilling bore") provided at the time of well drilling from above the ground (including above water) toward a production reservoir to acquire a hydrocarbon resource, and serving as a flow path of the hydrocarbon resource to recover the hydrocarbon resource after completion of the well.

The tools used to perform plugging and fracturing of a borehole, are among the tools known as "downhole tools". A downhole tool is typically not designed to be retrievable after use: it is removed by destruction or by making it into small fragments by milling, drill out, or another method, but substantial cost and time are required for milling, drill out, and the like.

Therefore, it has been recommended to form the whole tool or at least a component thereof (i.e. downhole tool member) with a degradable polymer to allow for the decomposition of the tool or tool member in the ground.

Poly(hydroxyacids), such as poly(glycolic acid) and poly (lactic acid) are among those polymers which are known to degrade.

Downhole tools made of poly(glycolic acid) have been previously described. U.S. Pat. No. 9,267,351 discloses a downhole tool member comprising a shaped body of a poly(glycolic acid) polymer having a weight-average molecular weight of at least 70,000, having an effective thickness which is ½ or more of a critical thickness of surface decomposition, and exhibiting a thickness reduction rate in water which is constant with respect to time. The poly(glycolic acid) is described as glycolic acid homopolymer consisting only of a glycolic acid unit ($—OCH_2—CO—$) as a recurring unit, or a glycolic acid copolymer which includes other monomer units, such as hydroxy carboxylic acid units, preferably lactic acid units, in a proportion of at most 50% weight. It is believed that these polymers have a linear architecture.

To increase the thickness reduction rate of the tool member in water over time, U.S. Pat. No. 9,574,418 teaches that compositions of poly(glycolic acid) with a short fiber reinforcement material, preferably in an amount of 1 to 50 parts per 100 parts of poly(glycolic acid), are required.

It has now been found that branched poly(hydroxyacids), notably certain branched poly(glycolic acid) polymers, can be successfully employed in the manufacture of downhole tool members which exhibit a thickness reduction rate in water which increases over time and which is higher than the thickness reduction rate in water of the downhole tool members made of the linear poly(glycolic acid) polymers of the prior art.

BRIEF DESCRIPTION OF THE DRAWINGS

FIG. 1 shows changes in thickness with time for branched poly(hydroxyacid) polymers.

SUMMARY OF INVENTION

An object of the invention is a downhole tool member comprising at least one element comprising: a branched poly(hydroxyacid) polymer obtained from the polycondensation reaction of a monomer mixture comprising:
(i) at least one hydroxyacid having only one hydroxyl group and only one carboxylic acid group [hydroxyacid (A)];
(ii) optionally at least one carboxylic acid having one or two carboxylic acid groups and being free from hydroxyl group [acid (C)], and
(iii) at least one polyfunctional reactant different from hydroxyacid (A) and acid (C), [reactant (F)], selected from the group consisting of:
  a. compounds containing at least one epoxy functional group, preferably compounds selected from the group consisting of epoxysilanes and polyepoxides;

b. mixtures comprising at least one polyol comprising at least three hydroxyl groups and being free from carboxylic acid group [polyol (H)] and at least one polyacid comprising at least two carboxylic acid groups and being free from hydroxyl groups [polyacid (O)]; and c. mixtures comprising at least one polyol comprising at least three hydroxyl groups and being free from carboxylic acid group [polyol (H)] and at least one alcohol comprising one or two hydroxyl groups and being free from carboxylic acid group [alcohol (AO)].

The Hydroxyacid (A)

Any hydroxyacid capable of polycondensing, i.e. of forming a macromolecule by condensation, that is chain addition of monomers with removal of water, can be used as hydroxyacid (A). Examples include glycolic acid, lactic acid, 3-hydroxybutyric acid, 4-hydroxybutyric acid, 4-hydroxyvaleric acid, 5-hydroxyvaleric acid, 6-hydroxycaproic acid. In general, hydroxyacids that have a primary alcohol are preferred as they are more reactive.

Preferably, hydroxyacid (A) is selected from the group consisting of glycolic acid, lactic acid (L- or D-isomers, either in racemic mixture or as single isomer), and mixtures thereof. Glycolic acid is particularly preferred.

Hydroxyacid (A) may consist of glycolic acid. Alternatively, hydroxyacid (A) may comprise glycolic acid and at least one hydroxyacid (A) different from glycolic acid. In said alternative variant, glycolic acid is preferably at least 50% moles, preferably at least 70% moles, even at least 95% moles of the total amount of hydroxyacid (A). When present, the amount of hydroxyacid (A) different from glycolic acid is of at most 5% moles, generally of at most 4% moles, preferably at most 3% moles; and/or said amount can be as low as 0.1% moles, with respect to the sum of moles of glycolic acid and hydroxyacid (A).

Acid (C)

Acid (C) is selected among carboxylic acids having one or two carboxylic groups and being free from hydroxyl groups. It is generally understood that better results are obtained with acids (C) wherein the total number of carbon atoms is at least 4, preferably at least 5 more preferably at least 6. Generally acid (C) possesses from 4 to 36 carbon atoms, preferably from 6 to 24 carbon atoms.

Among carboxylic acids having one carboxylic acid group which can be advantageously used as acid (C), mention can be notably made of aliphatic acids such as caprylic acid [$CH_3(CH_2)_6$—COOH], capric acid [$CH_3(CH_2)_8$—COOH], undecanoic acid [$CH_3(CH_2)_9$—COOH], dodecanoic or lauric acid [$CH_3(CH_2)_{10}$—COOH], tridecanoic acid [$CH_3(CH_2)_{11}$—COOH], tetradecanoic or myristic acid [$CH_3(CH_2)_{12}$—COOH], pentadecanoic acid [$CH_3(CH_2)_{13}$—COOH], hexadecanoic or palmitic acid [$CH_3(CH_2)_{14}$—COOH], octadecanoic or stearic acid [$CH_3(CH_2)_{16}$—COOH], arachidic acid [$CH_3(CH_2)_{18}$—COOH], behenic acid [$CH_3(CH_2)_{20}$—COOH]. An aliphatic acid (C) which has been shown to provide particularly good results is stearic acid, which is hence particularly preferred.

When acid (C) is an aromatic monocarboxylic acid, it is advantageously selected from the group consisting of benzoic acid, naphthoic acid and phenylacetic acid.

Among dicarboxylic acids which can be advantageously used as acid (C), mention can be made of succinic acid [HOOC—$(CH_2)_2$—COOH], glutaric acid [HOOC—$(CH_2)_3$—COOH], 2,2-dimethyl-glutaric acid [HOOC—$C(CH_3)_2$—$(CH_2)_2$—COOH], adipic acid [HOOC—$(CH_2)_4$—COOH], 2,4,4-trimethyl-adipic acid [HOOC—$CH(CH_3)$—$CH_2$—$C(CH_3)_2$—$CH_2$—COOH], pimelic acid [HOOC—$(CH_2)_5$—COOH], suberic acid [HOOC—$(CH_2)_6$—COOH], azelaic acid [HOOC—$(CH_2)_7$—COOH], sebacic acid [HOOC—$(CH_2)_8$—COOH], undecanedioic acid [HOOC—$(CH_2)_9$—COOH], dodecanedioic acid [HOOC—$(CH_2)_{10}$—COOH], tetradecanedioic acid [HOOC—$(CH_2)_{11}$—COOH], octadecanedioic acid [HOOC—$(CH_2)_{16}$—COOH].

The Polyfunctional Reactant (F)

The Compounds Containing at Least One Epoxy Functional Group

Notable non-limiting examples of suitable compounds containing at least one expoxy functional group are selected from the group consisting of epoxysilanes, in particular, glycidyloxypropyltrimethoxysilane or polyepoxides. Among polyepoxides mention may be made of bisphenol A diglycidyl ether (BADGE) or epoxidized oils such as epoxidized soybean oil or epoxidized linseed oil.

Mixtures Comprising at Least One Polyol (H) and at Least One Polyacid (O)

The Polyol (H)

The choice of polyol (H) is not particularly limited: any polyol comprising at least three hydroxyl groups and being free from carboxylic acid group may be used in the preparation of the branched poly(hydroxyacid).

Polyol (H) can be selected from the group consisting of:
triols, in particularly selected from the group consisting of glycerol, trimethylolpropane, trimethylolbutane, 2,3-di(2'-hydroxyethyl)-cyclohexan-1-ol, hexane-1,2,6-triol, 1,1,1-tris(hydroxymethyl)ethane, 3-(2'-hydroxyethoxy)propane-1,2-diol, 3-(2'-hydroxypropoxy)-propane-1,2-diol, 2-(2'-hydroxyethoxy)-hexane-1,2-diol, 6-(2'hydroxypropoxy)-hexane-1,2-diol, 1,1,1-tris-[(2'-hydroxyethoxy)-methylethane, 1,1,1-tris-[(2'-hydroxypropoxy)-methyl-propane, 1,1,1-tris-(4'-hydroxyphenyl)ethane, 1,1,1-tris-(hydroxyphenyl)-propane, 1,1,5-tris-(hydroxyphenyl)-3-methylpentane,
trimethylolpropane ethoxylate, trimethylolpropane propoxylate, tris(hydroxymethyl)aminomethane;
tetraols, in particularly selected from the group consisting of diglycerol, di(trimethylolpropane), pentaerythritol, 1,1,4-tris-(dihydroxyphenyl)-butane;
polyols comprising 5 hydroxyl groups, in particular triglycerol;
polyols comprising 6 hydroxyl groups, in particular dipentaerythritol; and
polyols comprising 8 hydroxyl groups, in particular tripentaerythritol.

Preferred polyols (H) are triols and tetraols. A polyol (H) which has been found to provide particularly good results within the frame of the present invention is trimethylolpropane.

The Polyacid (O)

Polyacid (O) can be any polyacid comprising at least two carboxylic acid groups and being free from hydroxyl groups. Polyacid (O) is different from acid (C) when this is present.

Polyacid (O) comprises at least two carboxylic acid groups, in particular two, three or four carboxylic acid groups.

Polyacid (O) can be selected among polycarboxylic aliphatic acids, polycarboxylic cycloaliphatic acids and polycarboxylic aromatic acids.

Examples of polycarboxylic aliphatic acids are: propane1,2,3-tricarboxylic acid (also known as tricarballylic acid); ethane-1,1,2,2 tetracarboxylic acid;
butane-1,2,3,4 tetracarboxylic acid; pentane-1,2,4,5-tetracarboxylic acid. Among them, butane-1,2,3,4 tetracarboxylic acid is preferred.

Examples of polycarboxylic cycloaliphatic acids are: 1,2,3,4-cyclobutane tetracarboxylic acid; 2,2,6,6-tetra-(carboxyethyl)cyclohexanone; (+)-(18-crown-6)-2,3,11,12-tetracarboxylic acid; cyclopentane-1,2,3,4 tetracarboxylic acid; cyclohexane-1,2,4,5 tetracarboxylic acid; cyclohexane-2,3,5,6 tetracarboxylic acid; 3-ethylcyclohexane-1,2,4,5 tetracarboxylic acid; 1-methyl-3-ethyl cyclohexane-3-(1,2)5,6 tetracarboxylic acid; 1-ethyl cyclohexane-1-(1,2),3,4 tetracarboxylic acid; 1-propylcyclohexane-1-(2,3),3,4 tetracarboxylic acid; 1,3-dipropylcyclohexane-1-(2,3),3-(2,3) tetracarboxylic acid; dicyclohexyl-3,4,3',4' tetracarboxylic acid.

Examples of polycarboxylic aromatic acids are: phthalic acids, including isophthalic acid and terephthalic acid, 2,5-pyridinedicarboxylic acid, 2,4 pyridinedicarboxylic acid, 3,5-pyridinedicarboxylic acid, 2,2 bis(4 carboxyphenyl)propane, bis(4-carboxyphenyl)methane, 2,2 bis(4 carboxyphenyl)hexafluoropropane, 2,2-bis(4-carboxyphenyl)ketone, 4,4' bis(4-carboxyphenyl)sulfone, 2,2-bis(3-carboxyphenyl) propane, bis(3 carboxyphenyl)methane, 2,2-bis(3-carboxyphenyl)hexafluoropropane, 2,2 bis(3-carboxyphenyl)ketone, bis(3-carboxyphenoxy)benzene, naphthalene dicarboxylic acids, including 2,6-naphthalene dicarboxylic acid, 2,7-naphthalene dicarboxylic acid,1,4-naphthalene dicarboxylic acid, 2,3-naphthalene dicarboxylic acid, 1,8-naphthalene dicarboxylic acid.

Among aromatic carboxylic acids having more than 2 carboxylic acid groups, mention may be made of: pyromellitic acid (1,2,4,5-benzene tetracarboxylic acid); trimesic acid (1,3,5-benzene tricarboxylic acid); trimellitic acid (1,3,4-benzene tricarboxylic acid); benzophenone-3,3',4,4'-tetracarboxylic acid; tetrahydrofuran-2,3,4,5-tetracarboxylic acid; 4,4'-(hexafluoroisopropylidene)diphthalic acid; 4,4'-oxydiphthalic acid anhydride; 4,4'-(4,4'-isopropylidenediphenoxy)bis(phthalic acid); 3,3',4,4'-biphenyl tetracarboxylic acid; 2,3,3',4'-biphenyl tetracarboxylic acid; 2,2',3,3'-biphenyl tetracarboxylic acid; 1,2,5,6-naphthalene tetracarboxylic acid; 2,3,6,7-naphthalene tetracarboxylic acid; perylene-3,4,9,10 tetracarboxylic acid; propane 2,2-bis (3,4-dicarboxyphenyl) acid; ethane 1,1-bis(2,3-dicarboxyphenyl) acid; ethane 1,1-bis(3,4-dicarboxyphenyl) acid; phenanthrene-1,8,9,10-tetracarboxylic acid; tetrahydrofuran-2,3,4,5-tetracarboxylic acid; 3,3',4,4'-benzophenone tetracarboxylic acid; 2,2',3,3'-benzophenone tetracarboxylic acid; 2,3,5,6-pyridine tetracarboxylic acid; 3,3',4,4'-tetraphenylsilane tetracarboxylic acid; 2,2'-bis-(3,4-bicarboxyphenyl) hexafluoropropane tetracarboxylic acid; 2,2-bis(3,4-dicarboxyphenyl) sulfonic acid; 4,4'-(hexafluoroisopropylidene) diphthalic acid; 3,3',4,4'-diphenylsulfone tetracarboxylic acid; ethyleneglycol bistrimellitic acid; hydroquinone diphthalic acid; pyrazine-2,3,5,6-tetracarboxylic acid; thiophene-2,3,4,5-tetracarboxylic acid.

Polyacids (O) which have been found to provide particularly good results within the frame of the present invention are phthalic acids, in particular isophthalic acid, tricarballylic acid, 1,2,4,5-benzene tetracarboxylic acid and butane-1,2,3,4 tetracarboxylic acid. Tricarballylic acid and isophthalic acid are particularly preferred.

Mixtures Comprising at Least One Polyol (H) and at Least One Alcohol (AO)

Polyol (H) is as detailed above.
The Alcohol (AO)

Alcohol (AO) can be a monoalcohol (MO) comprising one hydroxyl group, a diol (D) comprising two hydroxyl groups or a mixture of a monoalcohol (MO) and of a diol (D).

When alcohol (AO) is a monoalcohol (MO), it can be selected from aliphatic or aromatic monoalcohols.

Monoalcohol (MO) is characterized by a boiling point at atmospheric pressure, advantageously of at least 90° C., preferably of at least 100° C., more preferably of at least 125° C. and most preferably of at least 150° C.

Aliphatic monoalcohol (MO) is advantageously an aliphatic monoalcohol of formula below:

$R_{Hm}$—OH wherein $R_{Hm}$ is a monovalent aliphatic group having one or more than one carbon atom, in particular having 3 or more carbon atoms.

It is generally understood that better results are obtained with long chain aliphatic monoalcohols, i.e. aliphatic monoalcohols (MO) wherein the total number of carbon atoms is advantageously at least 6. The aliphatic monoalcohol (MO) possesses preferably from 6 to 36 carbon atoms and more preferably from 6 to 24 carbon atoms.

Among aliphatic monoalcohol (MO) which can be advantageously used in the present invention, mention can be notably made of hexanol-1 [$CH_3(CH_2)_5$—OH], dodecanol [$CH_3(CH_2)_{11}$—OH], hexadecanol or cetyl alcohol [$CH_3(CH_2)_{15}$—OH], octadecanol or stearyl alcohol $CH_3(CH_2)_{17}$—OH], arachidic alcohol $CH_3(CH_2)_{19}$—OH], docosanol or behenic alcohol [$CH_3(CH_2)_{21}$—OH], cyclohexanol and menthol.

When monoalcohol (MO) is an aromatic monoalcohol it is advantageously selected from the group consisting of phenol, cresol, naphthol, benzyl alcohol, 2-phenyl ethanol and 3-phenyl propanol.

Monoalcohol (MO) is preferably selected from the group consisting of dodecanol, benzyl alcohol, menthol and mixtures thereof.

When the alcohol (AO) is a diol (D), diol (D) is characterized by a boiling point at atmospheric pressure, advantageously of at least 100° C., preferably of at least 150° C., more preferably of at least 200° C. and most preferably of at least 230° C.

Non limiting examples of suitable diols (D) are notably ethylene glycol, 2,2-dimethylpropane-1,3-diol, pentane-1,2-diol, pentane-1,5-diol, hexane-1,2-diol, heptane-1,2-diol, diethylene glycol, hexane-1,6-diol, heptane-1,7-diol, 1,4-cyclohexanediol, cis 1,2-cyclohexanediol, trans 1,2-cyclohexanediol, polyetherpolyol diols Dianol® 220, 1,4-cyclohexane dimethanol, isosorbide, isoidide, dodecane 1,12-diol and mixtures thereof.

Diol (D) is preferably selected from the group consisting of diethyleneglycol, 1,4-cyclohexane dimethanol, isosorbide, isoidide, dodecane 1,12-diol and mixtures thereof.

The diol (D) is more preferably selected from the group consisting of diethyleneglycol, 1,4-cyclohexane dimethanol and mixtures thereof.

Diol (D) which has been shown to provide particularly good results is 1,4-cyclohexane dimethanol which is hence most particularly preferred, with a very particular preference to cis/trans isomer mixture of 1,4-cyclohexane dimethanol (CAS number 105-08-8).

Alcohol (AO) is preferably selected from the group consisting of diethyleneglycol, 1,4-cyclohexane dimethanol, isosorbide, isoidide, dodecane 1,12-diol, dodecanol, benzyl alcohol, menthol and mixtures thereof.

The Branched Poly(Hydroxyacid) Polymer

The branched poly(hydroxyacid) polymer used for the downhole tool member of the invention is obtained from the polycondensation reaction of a monomer mixture comprising:

(i) at least one hydroxyacid having only one hydroxyl group and only one carboxylic acid group [hydroxyacid (A)];
(ii) optionally at least one carboxylic acid having one or two carboxylic acid groups and being free from hydroxyl group [acid (C)], and
(iii) at least one polyfunctional reactant [reactant (F)] as detailed above.

The expression "branched polymer" is used herein with the meaning provided by IUPAC, that is to identify a polymer whose molecules are branched chains. In the present context, branching is introduced in the polymer chain by the presence of at least one polyfunctional reactant, reactant (F).

In a first embodiment of the invention, the branched poly(hydroxyacid) polymer may be selected among those polymers comprising recurring units deriving from the polycondensation reaction of a monomer mixture comprising at least one hydroxyacid (A) and at least one reactant (F) selected from the group consisting of compounds containing at least one epoxy functional group, preferably compounds selected from the group consisting of epoxysilanes and polyepoxides.

Polymers of the first embodiment are for instance those described in WO2010/112602A1 and can be prepared according to the processes described therein.

In a second embodiment of the invention, the branched poly(hydroxyacid) polymer is selected among those polymers comprising recurring units deriving from the polycondensation reaction of a monomer mixture comprising at least one hydroxyacid (A) and least one reactant (F) selected from mixtures comprising at least one polyol (H) having at least three hydroxyl groups and at least one polyacid (O) having at least three carboxylic acid groups.

In this second embodiment, hydroxyacid (A) is preferably selected from glycolic acid, lactic acid and their mixtures. More preferably, hydroxyacid (A) is glycolic acid.

Advantageously, the mixture comprising at least one polyol (H) and at least one polyacid (O) is selected from: a mixture of pentaerythritol and butanetetracarboxylic acid or a mixture of trimethylolpropane and tricarballylic acid.

Polymers of the second embodiment are for instance those described in WO2010/112602A1 and can be prepared according to the processes described therein.

In a third embodiment of the invention, the branched poly(hydroxyacid) polymer may be selected among those polymers obtained from the polycondensation reaction of a monomer mixture comprising at least one hydroxyacid (A), optionally at least one acid (C) and at least one reactant (F) selected from mixtures comprising at least one polyol (H) comprising at least three hydroxyl groups and at least one polyacid (O) comprising at least three carboxylic acid groups. In particular the branched poly(hydroxyacid) polymer may be selected among those polymers wherein the amount of acid (C) is such that the number of carboxylic acid groups thereof is comprised between 0.0001 to 0.010% with respect to the number of hydroxyl groups of hydroxyacid (A).

Preferably hydroxyacid (A) is selected from glycolic acid, lactic acid and their mixtures. More preferably hydroxyacid (A) is glycolic acid.

Polyol (H) is typically selected among triols (in particular trimethylolpropane) and tetraols (in particular pentaerythritol). A polyol (H) which has been found to provide particularly good results is trimethylolpropane.

Polyacids (O) which have been found to provide particularly good results are tricarballylic acid, 1,2,4,5-benzene tetracarboxylic acid and butane-1,2,3,4 tetracarboxylic acid, with tricarballylic acid being particularly preferred.

Generally, the amount of polyacid (O) and of polyol (H) in the branched poly(hydroxyacid) polymer of the third embodiment, when expressed in moles per mole of hydroxyacid (A), are substantially similar. The molar ratio polyacid (O):polyol (H) is in the range 1.5:1 to 0.5:1; preferably in the range 1.25:1 to 0.75:1, more preferably in the range 1.10:1 to 0.9:1.

The amount of acid (C), when present, is such that the number of carboxylic acid groups thereof is comprised between 0.0001 to 0.010% with respect to the number of hydroxyl groups of hydroxyacid (A). Preferably, said amount is such that the number of carboxylic acid group of said acid (C) is of at least 0.0005%, preferably at least 0.001% with respect to the number of hydroxyl groups of hydroxyacid (A) and/or at most 0.010%, preferably at most 0.008%, most preferably at most 0.007%, even more preferably at most 0.006% with respect to the number of hydroxyl groups of hydroxyacid (A).

Acid (C) is preferably a monocarboxylic acid. Stearic acid is particularly preferred.

Polymers of the third embodiment are for instance those described in WO2016173640A1 and can be prepared according to the processes described therein.

In a fourth embodiment of the invention, the branched poly(hydroxyacid) polymer may be selected among those polymers obtained from the polycondensation reaction of a monomer mixture comprising glycolic acid; optionally, at least one hydroxyacid (A) different from glycolic acid, in an amount of at most 5% moles, with respect to the sum of moles of glycolic acid and hydroxyacid (A); optionally at least one acid (C) having one carboxylic acid group; and at least one reactant (F) selected from mixtures comprising at least one polyol (H) comprising at least three hydroxyl groups and at least one polyacid (O) selected from the aromatic acids comprising two aromatic carboxylic acid groups. In particular those polymers wherein: the amount of polyol (H) is such that the number of hydroxyl groups thereof is comprised between 0.050 to 1.200% with respect to the overall number of carboxyl groups of glycolic acid and the hydroxyacid (A), if present; the amount of polyacid (O) is such that the number of carboxylic acid groups thereof is comprised between 0.050 to 0.750% with respect to the overall number of hydroxyl groups of glycolic acid and of the hydroxyacid (A), if present; and the amount of acid (C), when present, is such that the number of carboxylic acid groups thereof is comprised between 0.0001 to 0.010% with respect to the overall number of hydroxyl groups of glycolic acid and of the hydroxyacid (A), if present.

Polyol (H) is typically selected among triols (in particular trimethylolpropane) and tetraols (in particular pentaerythritol). Preferably, polyol (H) is trimethylolpropane.

Non limiting examples of suitable polyacids (O) comprising two aromatic carboxylic acid groups are phthalic acids, including isophthalic acid and terephthalic acid, 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl)hexafluoropropane, 2,2-bis(3-carboxyphenyl)ketone, bis(3-carboxyphenoxy)benzene, naphthalene dicarboxylic acids, including 2,6-naphthalene dicarboxylic acid, 2,7-naphthalene dicarboxylic acid,1,4-naphthalene dicarboxylic acid, 2,3-naphthalene dicarboxylic acid, 1,8-naphthalene dicarboxylic acid. Phthalic acids are generally preferred. Isophthalic acid has shown to provide particularly good results.

Acid (C) is a monocarboxylic acid. Stearic acid is particularly preferred.

Polymers of the fourth embodiment are those described for instance in WO2018115008A1 and can be prepared according to the processes described therein.

In a fifth embodiment of the invention, the branched poly(hydroxyacid) polymer is selected among those polymers obtained from the polycondensation reaction of a monomer mixture comprising: glycolic acid; optionally, at least one hydroxyacid (A) different from glycolic acid, wherein the molar amount of hydroxyacid (A) is of at most 5% moles with respect to the sum of moles of glycolic acid and hydroxyacid (A); optionally, at least one acid (C), said acid (C) having one carboxylic acid group; optionally at least one polyacid (O); and at least one reactant (F) selected from mixtures comprising at least one polyol (H) and at least one alcohol (AO).

Preferably, the branched poly(hydroxyacid) polymer is obtained from the polycondensation reaction of a monomer mixture consisting of: glycolic acid; optionally, at least one hydroxyacid (A) different from glycolic acid, wherein the molar amount of hydroxyacid (A) is of at most 5% moles with respect to the sum of moles of glycolic acid and hydroxyacid (A); at least one polyol (H); and at least one alcohol (AO), preferably at least one diol (D).

Most preferably, the branched poly(hydroxyacid) polymer is obtained from the polycondensation reaction of a monomer mixture consisting of: glycolic acid; optionally, at least one hydroxyacid (A) different from glycolic acid, wherein the molar amount of hydroxyacid (A) is of at most 5% moles with respect to the sum of moles of glycolic acid and hydroxyacid (A); at least one polyol (H); and at least one diol (D).

The hydroxyacid (A) is advantageously selected from the group consisting of lactic acid, 3-hydroxybutyric acid, 4-hydroxybutyric acid, 4-hydroxyvaleric acid, 5-hydroxyvaleric acid, 6-hydroxycaproic acid; preferably lactic acid.

Preferred polyols (H) are triols, in particular triols selected from the group consisting of glycerol, trimethylolpropane and trimethylolbutane, and tetraols, in particular pentaerythritol, as above detailed.

A polyol (H) which has been found to provide particularly good results is trimethylolpropane.

Polyol (H) is used in an amount such that the number of hydroxyl groups thereof is advantageously comprised between 0.050 and 1.200% with respect to the overall number of carboxyl groups of glycolic acid and of hydroxyacid (A), if present. Advantageously, polyol (H) is present in an amount such that the number of hydroxyl groups thereof is at least 0.075%, even at least 0.100%, preferably at least 0.120% with respect to the overall number of carboxyl groups of glycolic acid and of hydroxyacid (A), if present. Polyol (H) is present in an amount such that the number of hydroxyl groups thereof is at most 1.000%, even at most 0.750%, preferably at most 0.600% with respect to the overall number of carboxyl groups of glycolic acid and of hydroxyacid (A), if present.

When the alcohol (AO) is a monoalcohol (MO), it is preferably selected from the group consisting of dodecanol, benzyl alcohol, menthol and mixtures thereof.

When the alcohol (AO) is a diol (D), diol (D) is preferably selected from the group consisting of diethyleneglycol, 1,4-cyclohexane dimethanol, isosorbide, isoidide, dodecane 1,12-diol and mixtures thereof, more preferably diethyleneglycol, 1,4-cyclohexane dimethanol and mixtures thereof.

Diol (D) which has been shown to provide particularly good results is 1,4-cyclohexane dimethanol which is hence most particularly preferred, with a very particular preference to cis/trans isomer mixture of 1,4-cyclohexane dimethanol (CAS number 105-08-8).

Alcohol (AO) is preferably selected from diethyleneglycol, 1,4-cyclohexane dimethanol, isosorbide, isoidide, dodecane 1,12-diol, dodecanol, benzyl alcohol, menthol and mixtures thereof.

Alcohol (AO) is more preferably a diol (D), which is preferably characterized by a boiling point at atmospheric pressure of at least 100° C. and/or which is preferably used in an amount as defined below.

Alcohol (AO) is used in an amount such that the number of hydroxyl groups thereof is advantageously comprised between 0.010 and 1.200% with respect to the overall number of carboxylic groups of glycolic acid and of the hydroxyacid (A), if present.

Alcohol (AO) is used in an amount such that the number of hydroxyl groups thereof is advantageously of at least 0.010%, preferably of at least 0.050%, more preferably of at least 0.080% and most preferably of at least 0.100% and/or advantageously of at most 1.200%, even at most 1.000%, preferably of at most 0.750%, more preferably of at most 0.700%, most preferably of at most 0.650%, with respect to the overall number of carboxylic groups of glycolic acid and of the hydroxyacid (A), if present.

Advantageously, alcohol (AO) in an amount such that the number of hydroxyl groups thereof is of from 0.010 to 0.650% with respect to the overall number of carboxylic groups of glycolic acid and of hydroxyacid (A).

The polyol (H) and the alcohol (AO) are used in an amount such that the total number of moles of hydroxyl groups thereof minus the total number of moles of carboxylic groups of glycolic acid and of hydroxyacid (A), if present, divided by the total number of moles of carboxylic groups of glycolic acid and of hydroxyacid (A), if present, is comprised advantageously between 0 and 1.0%, preferably between 0.1 and 1.0% and more preferably between 0.3 and 0.9%.

Acid (C) is a monocarboxylic acid. Among aliphatic monoacids, stearic acid, which is particularly preferred. When acid (C) is an aromatic monoacid, it is advantageously selected from the group consisting of benzoic acid, naphthoic acid and phenylacetic acid.

When present, acid (C) is preferably an aromatic monoacid.

When present, acid (C) is a monoacid and it is used in an amount such that the number of carboxylic acid groups thereof is advantageously comprised between 0.010 and 2.0% with respect to the overall number of hydroxyl groups of glycolic acid and of hydroxyacid (A), if present. Acid (C) is used in an amount such that the number of carboxylic acid groups thereof is advantageously of at least 0.010%, preferably of at least 0.030%, more preferably of at least 0.075%, with respect to the overall number of hydroxyl groups of glycolic acid and of hydroxyacid (A), if present; and/or advantageously of at most 2.0%, preferably of at most 1.50%, more preferably of at most 1.20%, most preferably of at most 1.00%, even most preferably of at most 0.75%, with respect to the overall number of hydroxyl groups of glycolic acid and of hydroxyacid (A), The branched poly(hydroxyacid) polymer according to this fifth embodiment may optionally comprise recurring units derived from at least one polyacid (O) as above defined. The polyacid (O) can comprise two carboxylic acid groups or more than two carboxylic acid groups, in particular three or four carboxylic acid groups.

Among suitable polyacids (O) mention may be made of phthalic acids, tricarballylic acid, butane-1,2,3,4 tetracarboxylic acid, 1,2,4,5-benzene tetracarboxylic acid (pyromellitic acid). The polyacid (O) is preferably an aromatic diacid, more preferably a phthalic acid and most preferably isophthalic acid.

When present, polyacid (O) is used in an amount such that the number of carboxylic acid groups thereof is comprised between 0.025 and 1.200% with respect to the overall number of hydroxyl groups of glycolic acid and of the hydroxyacid (A), if present. When present, the polyacid (O) is used in amount such that the number of carboxylic acid groups thereof is of advantageously at least 0.025%, preferably at least 0.050% and more preferably at least 0.100% and/or of advantageously at most 1.200%, preferably at most 1.000%, more preferably at most 0.900%, most preferably at most 0.750% and particularly most preferably at most 0.650%, with respect to the overall number of hydroxyl groups of glycolic acid and of the hydroxyacid (A), if present. When present, an amount of polyacid (O) such that the number of carboxyl groups thereof is of from 0.150 to 0.550% with respect to the overall number of hydroxyl groups of glycolic acid and of hydroxyacid (A), if present, has been found particularly useful.

The branched poly(hydroxyacid) polymer as above detailed, may be obtained by a method comprising polycondensing glycolic acid, optionally at least one hydroxyacid (A), at least one polyol (H), at least one alcohol (AO), optionally at least one acid (C) and optionally at least one polyacid (O). In said method, a polycondensation catalyst may optionally be added to the monomer mixture. Such polycondensation catalysts are well known to a person skilled in the art and may be selected, for example, from tin (II) chloride, stannous octoate, zinc acetate, zinc lactate, methanesulfonic acid, orthophosphoric acid and mixtures thereof. Methanesulfonic acid and mixtures of methanesulfonic acid with other catalysts, the ones disclosed above or others, are particularly preferred.

When added, such a catalyst is usually added in an amount of about 0.001 to 2 mol %, in particular of about 0.002 to 0.1 mol % with respect to the total moles of the monomers of the monomer mixtures.

Preferably, the step of polycondensing is carried out at least partly at a temperature such that the monomers' mixture and the formed growing polymer are in the molten phase. Generally, after a step of polycondensing in the molten state, providing for a pre-polymer possibly comprising unreacted glycolic acid, hydroxyacid (A) (when present), polyol (H), alcohol (AO), monoacid (C) (when present) and polyacid (O) (when present), polycondensation is then pursued at a temperature such that the pre-polymer is in the solid state (this step will be referred hereunder as solid state polymerization or SSP).

Hence, the method generally includes a first step of polymerization in the molten state to form a pre-polymer and a second step of solid state polymerization (SSP) for increasing molecular weight of the pre-polymer.

In the first step, the temperature is selected so as to maintain the monomer mixture and, with the progress of the reaction, the formed pre-polymer, in the molten state.

Generally, the first step of polycondensation in the molten state is accomplished under stirring, by maintaining the reaction mixture at temperatures ranging from 160 to 240° C.

The pre-polymer, possibly comprising residual monomers, as above detailed, obtained from first step of polymerization in the molten state undergoes a step of solidification and size reduction, so as to provide particulate pre-polymer material in the form of loose particles.

The particulate pre-polymer may be processed from the molten state under the form of pearls or pellets through standard techniques of pelletization and/or pastillation, or can be recovered as solidified crumbs and milled so as to provide powder.

When recovering pre-polymer, possibly comprising residual monomers, as above detailed, by solidification under the form of crumbs, a milling step is required. Such a milling step may be carried out by any means known to a person skilled in the art, for example by milling in a high-speed grinder or in a rotary mill.

The SSP step may take place by exposing the pre-polymer, possibly comprising residual monomers, as above detailed, in its solid state, either under vacuum or under an inert gas atmosphere (e.g. under nitrogen) or both, for one or more hours or even several days, at a temperature above the glass transition temperature of the said pre-polymer, possibly comprising residual monomers, as above detailed, but below its melting temperature. Typically, such a SSP step may be carried out at a temperature of 140 to 240° C., in particular of 150 to 230° C., for example at around 170-220° C. and at a pressure below 50 mbar.

Depending on the nature of the residual monomer(s) in the pre-polymer, on their proportions and on the target final viscosity/molecular weight, on the temperature and on the pressure during the overall polycondensation step, the duration of the SSP step may be a few hours to 1 week, in particular from 6 to 200 h, for example of about 10 to 150 h.

Preferably, the polycondensation reaction in the molten phase takes place under vacuum in order to evaporate the water of reaction and prevent the latter from hydrolyzing the polymer chains being formed. Very particularly preferably, polycondensation reaction in the molten phase is initiated at atmospheric pressure and the vacuum is applied gradually until a pressure of the order of a few mbar, in particular less than 50 mbar, preferably less than 20 mbar, is achieved. The SSP step is typically carried out at a pressure of about 0.1 to 50 mbar, preferably of about 0.1 to 20 mbar.

The Downhole Tool Member

Object of the invention is a downhole tool member comprising at least one element comprising the branched poly(hydroxyacid) as detailed above.

The expressions "downhole tool", "downhole tool member" or "element of a downhole tool member" are used to refer to a piece of oilfield equipment that is used during drilling, completion or repair of downholes, including the tools used to perform plugging and fracturing of a borehole.

Notable, non limiting examples of downhole tools and/or downhole tool members and/or element of a downhole tool member are for instance frac plugs or disintegratable plugs, bridge plugs, cement retainers, perforation guns, ball sealers, frac balls, diverting balls, ball seats, mandrels, slips, wedges, rings, sealing plugs, frac sleeves, fracture sleeve pistons (also known as a "piston" or "piston plugs") and packers.

One or more than one part of the downhole tool, generically referred to as "downhole tool member", may be made of the branched poly(hydroxyacid) as detailed above. Alternatively, the totality of the downhole tool structure may be made of the branched poly(hydroxyacid).

The downhole tool member of the present invention usually comprises at least one element made of the branched poly(hydroxyacid) alone, however it is also possible to blend said polymer with other polymers. Examples of other polymers include polyolefin resins such as polyethylene and polypropylene; polyamide resins such as poly-L-lysine; acrylic resins; polyethers such as polyethylene glycol and polypropylene glycol; denatured polyvinyl alcohol; soft polyolefin resins such as ethylene/glycidyl methacrylate copolymers, ethylene/propylene terpolymers, and ethylene/butylene homopolymers; styrene copolymer resins; polyphenylene sulfide resins; polyether ether ketone resins; polyester resins such as polyethylene terephthalate and polybutylene terephthalate; polyacetal resins; polysulfone resins; polyphenylene ether resins; polyimide resins; polyether imide resins; cellulose esters; polyurethane resins; phenol resins; melamine resins; unsaturated polyester resins; silicone resins; and epoxy resins. Two or more types of these other polymers may be contained in the composition.

The branched poly(hydroxyacid) may also be blended with fillers.

Advantageously the downhole tool member of the invention may comprise at least one element comprising a composition comprising the branched poly(hydroxyacid) and a filler.

The nature of the filler is not particularly limited, and any filler of a fiber shape or a whisker shape may be used. A filler other than a fibrous or whisker-like filler may also be used, such as a sheet-like (stratified), powdered, or granular filler. In addition, fillers of various compositions may be used, such as carbon-based, metal-based, or silicon-based fillers.

Specific examples of fibrous or whisker-like fillers that may be used include fibrous fillers such as glass fibers (long fiber type or short fiber type chopped strands, mild fibers, or the like), Pan-type or pitch-type carbon fibers, graphite fibers, metal fibers such as aluminum fibers, brass fibers, or stainless steel fibers, alumina fibers, zirconia fibers, ceramic fibers, asbestos fibers, gypsum fibers, silicon carbide fibers, silica fibers, titanium oxide fibers, and rock wool; and whisker-like fillers such as potassium titanate whiskers, barium titanate whiskers, aluminum borate whiskers, silicon nitride whiskers, zinc oxide whiskers, calcium carbonate whiskers, wollastonite whiskers, and aluminum borate whiskers.

Examples of fillers other than fibrous or whisker-like fillers that may be used include silicates such as silicon oxide (silica, silica sand, or the like); talc, kaolin, mica, aluminosilicate, and magnesium silicate; stratified silicates; metal oxides such as magnesium oxide, alumina, zinc oxide, zirconium oxide, titanium oxide, iron oxide, antimony oxide, tungstic acid, and vanadium; sulfates such as calcium sulfate, barium sulfate, and aluminum sulfate; hydroxides such as calcium hydroxide, magnesium hydroxide, and aluminum hydroxide; clay minerals such as montmorillonite, kaolinite, beidellite, saponite, nontronite, hectorite, sauconite, vermiculite, halloysite, kanemite, octosilicate, magadiite, kenyaite, zirconium phosphate, and titanium phosphate; stratified phosphates such as hydroxyapatite; and other sheet-like, granular, or powdered inorganic fillers such as glass beads, glass balloons, ceramic beads, glass flakes, glass powder, boron nitride, silicon carbide, calcium phosphate, carbon black, and graphite.

Of these fillers, silicon oxide, silicates, carbonates, clay minerals, inorganic fibrous fillers, or inorganic whisker-like fillers are preferable, and silica sand, silica, talc, kaolin, mica, calcium carbonate, magnesium carbonate, barium carbonate, barium sulfate, montmorillonite, glass fibers, carbon fibers, or graphite fibers are particularly preferable.

Two or more types of fillers may be used in combination.

The filler is typically present in an amount of 10 to 70 weight % with respect to the total weight of the branched poly(hydroxyacid) and the filler, preferably from 10 to 60 weight %, and more preferably from 15 to 40 weight %.

The downhole tool members or the downhole tools comprising said members of the invention may be manufactured using known melt processing techniques, such as injection molding, extrusion or any other forming or thermoforming techniques.

The branched poly(hydroxyacid) polymer has a particularly advantageous degradation behaviour, which makes it particularly useful in the production of downhole tool members which are rapidly degraded into the ground, even at low temperatures.

Should the disclosure of any patents, patent applications, and publications which are incorporated herein by reference conflict with the description of the present application to the extent that it may render a term unclear, the present description shall take precedence.

Should the disclosure of any patents, patent applications, and publications which are incorporated herein by reference conflict with the description of the present application to the extent that it may render a term unclear, the present description shall take precedence.

The invention will be now be described in more detail with reference to the following examples, whose purpose is merely illustrative and not intended to limit the scope of the invention.

EXAMPLES

Example 1

A 7.5 L stainless steel double jacketed reactor, equipped with heater, condenser, temperature and pressure sensors and mechanical stirrer was charged with 4500 g of a 70 wt % of an aqueous glycolic acid solution (41.420 mole, taken as 1.0000 mol basis), 10.004 g of trimethylolpropane (0.075 mole, 0.0018 mol per mol of glycolic acid), 3.584 g of cyclohexanedimethanol (0.025 mole, 0.0006 mol per mol of glycolic acid) and 0.536 g of methanesulfonic acid (0.006 mole, 0.00014 mol per mol of glycolic acid).

The reactor was then closed and purged three times using alternatively vacuum and nitrogen. The reaction solution was heated rapidly to 50° C. under mechanical stirring. Pressure was reduced to 600 mbar and heating was pursued from 50° C. up to 100° C. over 30 min. The water distillation was started. The temperature was slowly raised to 130° C. over 60 min to gently pursue the water distillation. When most of the water was removed, the temperature was increased faster to 220° C. over 30 min.

Once 220° C. was reached, the pressure was progressively decreased down to 30 mbar over 30 min. Temperature was then finally raised up to 230° C. and kept steady for the rest of the synthesis. The vacuum was applied for 270 min more to increase the glycolic acid conversion.

The reaction mixture was then brought back to atmospheric pressure using nitrogen. The polymer was drawn from the kettle through the bottom valve and recovered in SS trays over dry ice. The hard solidified polymer mass was taken out and weighed. Crude yield: 2.10 kg (~88%).

The polymer was grinded into small particles with less than 2 mm diameter using a high speed grinder, classified through a 2 mm sieve and further dried in a vacuum oven at 90° C. overnight.

In order to obtain an homogeneous particle size distribution and consistency, the powder was pelletized on a 19 mm diameter BRABENDER extruder, equipped with a 25 L/D monoscrew having a compression ratio of 3:1. The die was a one strand die (2 mm hole) and the strand was "die faced cut" in dry conditions. Screw speed used was 60 rpm and the temperature profile was kept low (flat temperature profile of 195° C., 4 heating zones in the extruder; 1 heating zone in the die), to cope with the low viscosity of the pre-polymer melt polymerized. Typical output was around 2.1 kg/h. Pellet size obtained was approximately 2 mm diameter and approximately 3 mm length.

The pellets so-obtained were introduced in a double wall rotary tumbler unit for uniform mixing and further polymerization in the solid state by applying heat and pulling vacuum. The tumbler used had a 15 L total volume/6 L useful volume. About 2 kg of polymer was used per batch.

After closing the tumbler, rotation was started at 8 rpm. The vacuum pump was started to reach 5-10 mbar vacuum in the tumbler. Simultaneously the tumbler was flushed with nitrogen (flow rate set at 50 L/h). Oil circulating in the double wall was heated in order to ramp up the temperature from room temperature to 214° C. in 16 h.

The tumbler was equipped with a sampling valve so that a specimen of reduced quantity of the polymer could be carefully taken out to analyze the melt viscosity using a parallel plate rheometer, at different times of solid state polymerization (SSP). After achieving the desired melt viscosity, the heating was stopped, the SSP was discontinued and the product was cooled down.

After 66 hours of SSP at 214° C., 1.8 kg of a poly(glycolic acid) polymer having a melt viscosity of 647 Pa×sec at a shear rate of 10 sec$^{-1}$ was obtained.

The residual methanesulfonic acid in the final polymer after SSP was titrated according to the described method and found to be 0.005 mol % in regard to glycolic acid units.

Example 2

Using the same equipment and protocol as for Example 1, a load of 4500 g of a 70 wt % of an aqueous glycolic acid solution (41.420 mole, taken as 1.0000 mol basis), 8.892 g of trimethylolpropane (0.066 mole, 0.0016 mol per mol of glycolic acid), 6.193 g of isophthalic acid (0.037 mole, 0.0009 mol per mol of glycolic acid) and 0.819 g of methanesulfonic acid (0.009 mole, 0.00021 mol per mol of glycolic acid), was converted into 2.15 kg of poly(glycolic acid) polymer (crude yield 90%).

The exact same protocol to pelletize the powder and increase melt viscosity by SSP was applied as in Example 1.

After 63 hours of SSP at 214° C., 1.8 kg of a poly(glycolic acid) polymer having a melt viscosity of 582 Pa×sec at a shear rate of 10 sec$^{-1}$ was obtained.

The residual methanesulfonic acid in the final polymer after SSP was titrated according to the described method and found to be 0.005 mol % in regard to glycolic acid units.

Linear Thickness Reduction Testing

Parts having a 5 cm$^2$ base and 12.7 mm height were prepared by melt processing polymers of example 1 and 2. The parts were crystallized in an oven for 1 hour at 120° C. Then the parts were placed into 800 mL bottles with deionised water and placed in an oven at 80° C. Jars were pulled at various times and the parts were dried overnight. The following day, the parts were cut and the non-degraded section thickness was measured.

FIG. 1 is a graph showing changes in thickness with time for the branched poly(hydroxyacid) polymers of Example 1 and 2.

The data shows that as time increases, degradation rate also increases, giving rise to a nonlinear curve of part thickness reduction.

The average thickness reduction rate was around 75 micron/hr for the first 24 hours of the run. The thickness reduction rate increased to around 130 micron/hr for the last 72 hours of the run.

An increase of thickness reduction rate has the advantage of faster part degradation in the well. Thus the time required for eliminating the residual parts of the tool or tool member in the well are reduced. This is particularly important in North American wells that are generally at a relatively low temperature.

The invention claimed is:

1. A downhole tool member comprising at least one element comprising: a branched poly(hydroxyacid) polymer obtained from polycondensation reaction of a monomer mixture comprising:
   (i) glycolic acid; optionally, at least one hydroxyacid (A) having only one hydroxyl group and only one carboxylic acid group different from glycolic acid, in an amount of at most 5% moles, with respect to the sum of moles of glycolic acid and hydroxyacid (A);
   (ii) optionally at least one carboxylic acid having one carboxylic acid group and being free from hydroxyl group (acid (C)), and
   (iii) at least one polyfunctional reactant different from hydroxyacid (A) and acid (C), (reactant (F)), selected from the group consisting of:
      a. mixtures comprising at least one polyol comprising at least three hydroxyl groups and being free from carboxylic acid group (polyol (H)) and at least one polyacid selected from the aromatic acids comprising two aromatic carboxylic acid groups and being free from hydroxyl groups (polyacid (O)) and wherein the amount of polyol (H) is such that number of hydroxyl groups thereof is comprised between 0.050 to 1.200% with respect to overall number of carboxyl groups of glycolic acid and the hydroxyacid (A), if present; the amount of polyacid (O) is such that the number of carboxylic acid groups thereof is comprised between 0.050 to 0.750% with respect to overall number of hydroxyl groups of glycolic acid and of the hydroxy acid (A), if present; and the amount of acid (C), when present, is such that the number of carboxylic acid groups thereof is comprised between 0.0001 to 0.010% with respect to the overall number of hydroxyl groups of glycolic acid and of the hydroxy acid (A), if present; and
      b. mixtures comprising at least one polyol comprising at least three hydroxyl groups and being free from carboxylic acid group (polyol (H)) and at least one alcohol comprising one or two hydroxyl groups and being free from carboxylic acid group (alcohol (AO)), wherein amount of polyol (H) is such that the number of hydroxyl groups thereof is comprised between 0.050 and 1.200% with respect to the overall number of carboxyl groups of glycolic acid and of the hydroxyacid (A), if present; the amount of alcohol (AO) is such that the number of hydroxyl groups thereof is comprised between 0.010 and 1.200% with respect to the overall number of carboxylic groups of glycolic acid and of the hydroxyacid (A), if present; and the amount of monoacid (C), when present, is such that the number of carboxylic acid groups thereof is comprised between 0.010 and 2.0% with respect to the overall number of hydroxyl groups of glycolic acid and of the hydroxyacid (A), if present.

2. The downhole tool member according to claim 1 wherein the hydroxyacid (A) is selected from the group consisting of lactic acid, 3-hydroxybutyric acid, 4-hydroxybutyric acid, 4-hydroxyvaleric acid, 5-hydroxyvaleric acid and 6-hydroxycaproic acid, and/or wherein the hydroxyacid (A) is present in an amount of at most 4% moles with respect to the sum of moles of glycolic acid and of hydroxyacid (A).

3. The downhole tool member according to claim 1, wherein the polyol (H) is selected from the group consisting of: triols selected from the group consisting of glycerol, trimethylolpropane and trimethylolbutane, and tetraols; and/or wherein the polyol (H) is used in an amount such that the number of hydroxyl groups thereof is of at least 0.050%, with respect to the overall number of carboxylic groups of glycolic acid and of the hydroxyacid (A), if present.

4. The downhole tool member according to claim 1, wherein alcohol (AO) is a diol (D), characterized by a boiling point at atmospheric pressure, of at least 100° C., and/or a diol (D) used in an amount such that the number of hydroxyl groups thereof is of at least 0.010% and/or of at most 1.200% with respect to the overall number of carboxylic groups of glycolic acid and of the hydroxyacid (A), if present.

5. The downhole tool member according to claim 1, wherein the alcohol (AO) is a diol (D) which is selected from the group consisting of diethyleneglycol, 1,4-cyclohexane dimethanol, isosorbide, isoidide, dodecane 1,12-diol and mixtures thereof.

6. The downhole tool member according to claim 1, wherein acid (C) is an aliphatic monoacid of formula: $R_{Hm}$—COOH wherein $R_{Hm}$ is a monovalent aliphatic group having one or more than one carbon atom, or an aromatic monoacid selected from the group consisting of benzoic acid, naphthoic acid and phenylacetic acid and/or wherein polyacid (O) is an aromatic diacid.

7. A downhole tool comprising a downhole tool member of claim 1.

8. A downhole tool member of claim 1 which is selected from the group consisting of ball sealers, frac balls, diverting balls, ball seats, mandrels, slips, wedges, and rings.

9. The downhole tool member according to claim 1 wherein, the compound containing at least one epoxy functional group is selected from the group consisting of epoxysilanes and polyepoxides.

10. The downhole tool member according to claim 1 wherein the reactant (F) is selected from mixtures comprising at least one polyol (H) and at least one polyacid (O), wherein polyol (H) is trimethylolpropane or pentaerythritol.

11. The downhole tool member according to claim 1 wherein the reactant (F) is selected from mixtures comprising at least one polyol (H) and at least one polyacid (O), wherein polyacid (O) is isophthalic acid or terephthalic acid.

12. A method for manufacture of a downhole tool member or of a downhole tool, said method comprising melt processing and injection molding or extruding a composition comprising a branched poly(hydroxyacid) polymer obtained from a polycondensation reaction of a monomer mixture comprising:
(a) glycolic acid; optionally, at least one hydroxyacid (A) having only one hydroxyl group and only one carboxylic acid group different from glycolic acid, in an amount of at most 5% moles, with respect to the sum of moles of glycolic acid and hydroxyacid (A);
(ii) optionally at least one carboxylic acid having one carboxylic acid groups and being free from hydroxyl group (acid (C)), and
(iii) at least one polyfunctional reactant different from hydroxyacid (A) and acid (C), reactant (F), selected from the group consisting of:
  a. mixtures comprising at least one polyol comprising at least three hydroxyl groups and being free from carboxylic acid group (polyol (H)) and at least one polyacid selected from the aromatic acids comprising two aromatic carboxylic acid groups and being free from hydroxyl groups (polyacid (O)) and wherein the amount of polyol (H) is such that number of hydroxyl groups thereof is comprised between 0.050 to 1.200% with respect to overall number of carboxyl groups of glycolic acid and the hydroxyacid (A), if present; the amount of polyacid (O) is such that the number of carboxylic acid groups thereof is comprised between 0.050 to 0.750% with respect to overall number of hydroxyl groups of glycolic acid and of the hydroxy acid (A), if present; and the amount of acid (C), when present, is such that the number of carboxylic acid groups thereof is comprised between 0.0001 to 0.010% with respect to the overall number of hydroxyl groups of glycolic acid and of the hydroxy acid (A), if present; and
  b. mixtures comprising at least one polyol comprising at least three hydroxyl groups and being free from carboxylic acid group (polyol (H)) and at least one alcohol comprising one or two hydroxyl groups and being free from carboxylic acid group (alcohol (AO)), wherein amount of polyol (H) is such that the number of hydroxyl groups thereof is comprised between 0.050 and 1.200% with respect to the overall number of carboxyl groups of glycolic acid and of the hydroxyacid (A), if present; the amount of alcohol (AO) is such that the number of hydroxyl groups thereof is comprised between 0.010 and 1.200% with respect to the overall number of carboxylic groups of glycolic acid and of the hydroxyacid (A), if present; and the amount of monoacid (C), when present, is such that the number of carboxylic acid groups thereof is comprised between 0.010 and 2.0% with respect to the overall number of hydroxyl groups of glycolic acid and of the hydroxyacid (A), if present;
to form the downhole tool member or the downhole tool.

13. A downhole tool of claim 7 which is selected from the group consisting of frac plugs, disintegratable plugs, bridge plugs, cement retainers, perforation guns, sealing plugs, frac sleeves, fracture sleeve pistons and packers.

* * * * *